United States Patent [19]

Schmidt et al.

[11] Patent Number: 5,446,778
[45] Date of Patent: Aug. 29, 1995

[54] MOUNTING ASSEMBLY FOR AN AXLE IN A HOUSING

[75] Inventors: Roland Schmidt, Erlangen; Hans Stroehlein, Nuremberg; Thomas Weller, Erlangen, all of Germany

[73] Assignee: Siemens Aktiengesellschaft, Munich, Germany

[21] Appl. No.: 353,691

[22] Filed: Dec. 12, 1994

Related U.S. Application Data

[63] Continuation of Ser. No. 34,774, Mar. 19, 1993.

[30] Foreign Application Priority Data

Mar. 27, 1992 [DE] Germany ............. 42 10 146.8

[51] Int. Cl.⁶ ........................................ H01J 35/10
[52] U.S. Cl. .................................. 378/125; 378/121
[58] Field of Search .......................... 378/125, 121

[56] References Cited

U.S. PATENT DOCUMENTS 3,173,473 3/1965 Loveland .
3,560,030 2/1971 Macks et al. .
5,026,175 6/1991 Sato .

FOREIGN PATENT DOCUMENTS 1253895 1/1961 France .
2151257 4/1973 France .
3325459A1 1/1984 Germany .
3724893 2/1989 Germany .
91 11 611.2 2/1992 Germany .
2226594 7/1990 United Kingdom .

Primary Examiner—Craig E. Church
Attorney, Agent, or Firm—Hill, Steadman & Simpson

[57] ABSTRACT

A mounting part for mounting an end of an axle on a projection of a housing, such as an axle in a vacuum-tight housing of a rotatable anode, is characterized by a sleeve section which can have radial play during assembly and engages a clamp arrangement to remove the radial play at the end of assembly of the section on either the end of the axle or the projection of the housing. The clamp arrangement is a bevel provided on the member being telescopically received in the section or on a ring which is telescopically received on the member being received in the section.

2 Claims, 4 Drawing Sheets

MOUNTING ASSEMBLY FOR AN AXLE IN A HOUSING

This is a continuation of application Ser. No. 08/034,774, filed Mar. 19, 1993.

BACKGROUND OF THE INVENTION

The present invention is directed to the mounting assembly for an axle in a housing, wherein at least one end of the axle is connected to the housing with a mounting part or sleeve.

Building an axle mounted in this way into a housing does not represent a problem when the assembly can be obtained under visual control. If, due to the shape of the housing, it is necessary to introduce, for example, the end of the axle into the mounting part, then problems can occur. Apart from the fact that it is difficult to first align the end of the axle and the mounting part relative to one another so that these essentially align with one another, there is also the risk that the parts may jam or seize as a consequence of the inadequate possibilities of monitoring the assembly procedure. Such a seizure or jamming can lead to damage to the end of the axle or, respectively, of the mounting part. This problem can, likewise, be partially avoided given employment of a complicated assembly device so that a greater radial play of the axle than what is inherently desirable is often allowed in order to facilitate assembly.

SUMMARY OF THE INVENTION

The object of the present invention is to fashion or construct a mounting part or sleeve for mounting an axle in a housing, which mounting part or sleeve can also be unproblematically assembled without visual control. Moreover, the prerequisite for a radially play-free mounting of the end of the axle with the mounting part should be created.

This object is inventively achieved by a mounting assembly for an axle in a housing, wherein at least one end of the axle is connected to the housing with a mounting part or sleeve. The assembly includes a mounting part comprising a sleeve section into which the end of the axle or a projection of the housing can be introduced with radial play during assembly, and clamping means are provided which will seat the sleeve section on the end of the axle or the housing projection at the end of the assembly process. In the mounting of the invention, the radial play exists between the end of the axle or, respectively, the housing projection, on the one hand, and the mounting part, on the other hand, at the beginning of the assembly process, but this play is reduced, and preferably completely eliminated, at the end of the assembly process under the influence of the clamp means. The assembly process in the mounting assembly of the invention, thus, assumes a significantly simpler form than in the prior art, because the radial play is present at the beginning of the assembly process, which allows the end of the axle or, respectively, the housing projection to be introduced into the sleeve section of the mounting part, even under unfavorable conditions and without visual control. Since there is the possibility of holding the axle without any and all radial play as warranted, likewise, there is obviously no necessity of providing an undesirably great radial play. When it is said that the clamp means seats the sleeve section at the end of the axle or, respectively, the housing part, then this is intended to cover both the seating of the sleeve section at the end of the axle or, respectively, at the housing projection, which is completely free of radial play, as well as the presence of a slight radial play, for example on the order of magnitude of 200 μm in the present case. What is to be understood by the housing projection in the present case is the projection suitably shaped for acceptance of the sleeve section, and this projection or shoulder is connected to the housing in such a way that it is suitable for supporting the axle.

German Offenlegungsschrift 33 25 459 A1 and German Gebrauchsmuster G 91 11 661.2 both disclose the mounting of an axle or, respectively, of a section of rod of a pipe or the like with a mounting part. However, no clamp means are provided to seat a sleeve section of the mounting part at the respective part that is to be held.

In the preferred embodiments of the present invention, it is provided that the sleeve section is fashioned radially resilient. This measure makes it easy for the clamping means to seat the sleeve section at the end of the axle or, respectively, at the housing projection. The radial resiliency of the sleeve section can be realized in a version of the invention in that the sleeve section comprises at least one axially proceeding incision or slot and is subdivided into a plurality of fingers by a plurality of axially extending incisions or slots.

It is provided in another, especially preferred embodiment of the invention that the clamp means comprises a bevel provided on the axle or, respectively, on the housing projection, and this bevel comes into engagement with the ends of the sleeve section at the end of the assembly process. The clamp means can be realized with little outlay in this manner. The bevel can thereby be fashioned both on the axle or, respectively, on the housing projection itself. However, a ring put in place on the axle or, respectively, on the housing projection can also be provided, and this ring provides the bevel. In this latter version, it is extremely beneficial in terms of manufacturing technology, since the bevel is fashioned as a separate part and can be correspondingly easily manufactured. For the reason of simplifying the assembly and last, but not least, for the production-associated reasons, it is expedient to annularly fashion the bevel.

In order to assure that the forces to be exerted are not unnecessarily great at the end of the assembly process when the sleeve section is telescopically seated on the end of the axle or, respectively, on the housing projection, it is provided in a version of the invention that the region of the sleeve section coming into engagement with the bevel has a corresponding bevel.

In order to be able to compensate manufacturing tolerances in an axial direction, the mounting part in a version of the present invention comprises an axially resilient region that is preferably formed by at least one section shaped like a compound Belleville spring washer so that this section has two flanges interconnected at their outer annular portions to form a V-shaped cross section.

It is also provided in the preferred embodiment of the invention that the axle is the axle of a rotating anode and that the housing is the vacuum housing of a X-ray tube.

Other advantages and features of the invention will be readily apparent from the following description of the preferred embodiments, the drawings and claims.

DESCRIPTION OF THE PREFERRED EMBODIMENTS

Figure 1:
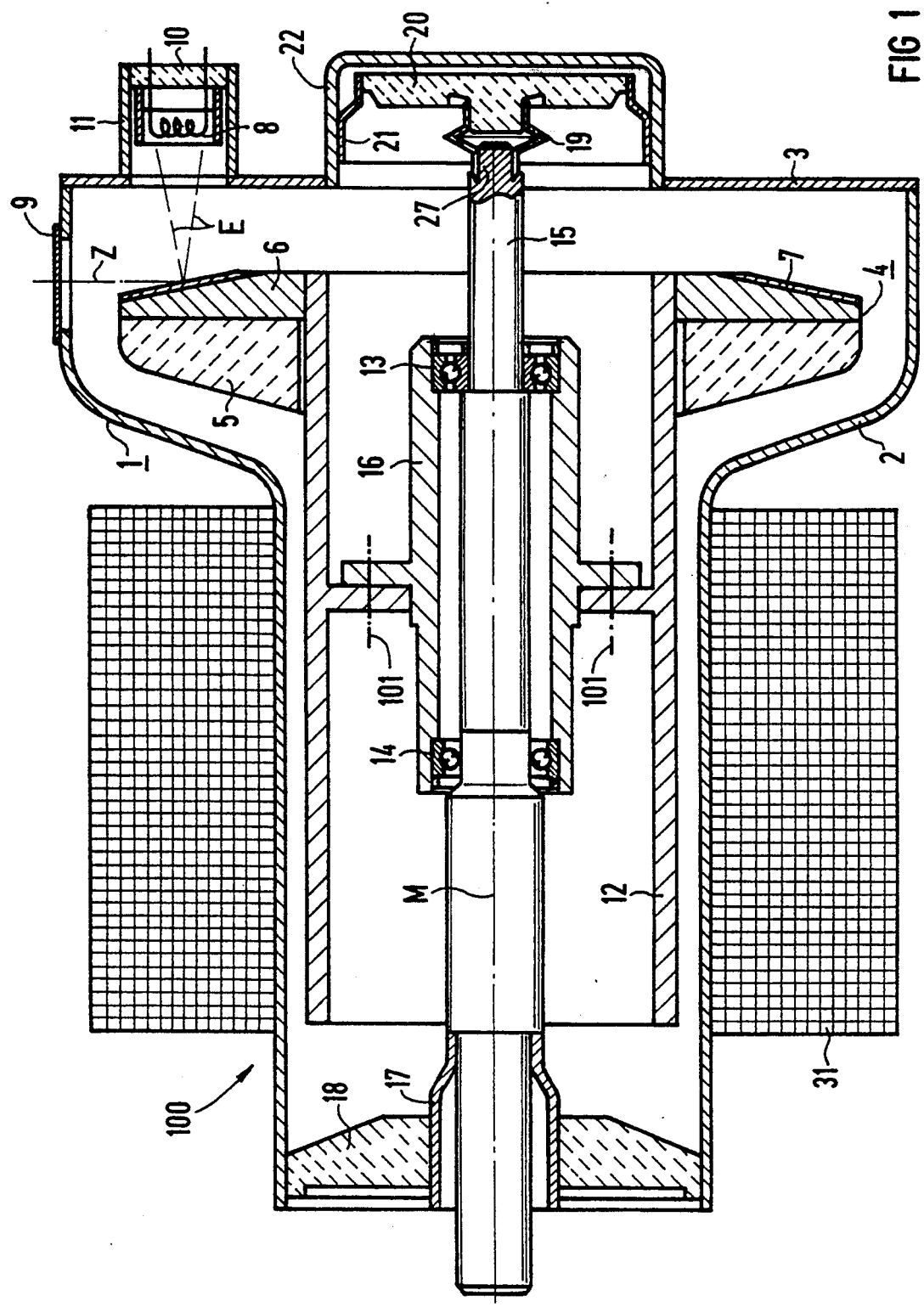
FIG. 1 is a schematic longitudinal cross sectional view of an X-ray tube having a rotating anode whose axle is seated in the vacuum housing of the X-ray tube by a mounting assembly of the present invention.

The principles of the present invention are particularly useful when incorporated in a rotating anode X-ray tube, generally indicated at 100 in FIG. 1. The X-ray tube 100 comprises an essentially metal vacuum housing 1, which is formed by main component parts, which are two housing parts 2 and 3. The housing part 2 is fashioned with a funnel shape and essentially dynamically balanced relative to a central axis M of an X-ray tube. The larger end of the part 2 is closed with an essentially circular disk-shaped housing part 3. The two housing parts 2 and 3 are joined vacuum-tight to one another, for example by soldering. An anode dish 4 of the rotating anode of the X-ray tube 100 is situated in the inside of the vacuum housing 1 in the region of the larger diameter of the housing part 2. The anode dish 4 is composed, in a known way, of a graphite member 5 and a metal member 6 that is composed of a refractory material and essentially contains tungsten. The metal member 6 is provided with a coating 7 that is composed of a tungsten-rhenium alloy in a known way.

An electron beam E coming from a glow cathode 8 of the X-ray tube impinges on the coating 7. The X-ray beam thereby produced, with only the central ray Z being shown in FIG. 1, will emerge from the vacuum housing I through a beam exit window 9. The beam exit window 9 is constructed, for example, of beryllium and is applied in the region of the larger diameter of the housing part 2 and is joined thereto vacuum-tight in a known way by soldering.

The glow cathode 8 is held by an insulator 10 in a tubular, metallic housing part 11 that is accepted in a focussing slot of a schematically indicated concentrating cup. The housing part 11 closes an opening of the corresponding diameter in the housing part 3 in a vacuum-tight manner, whereby the parts 3 and 11 are joined to one another, for example, by soldering. It is self-understood that the insulator 10 is also introduced vacuum-tight into the housing part 11 and is connected thereto in a known manner, for example by soldering.

The annular anode dish 4 is torsionally connected to a tubular, metallic rotor 12, for example by soldering. The anode dish 4 and the rotor 12 are fashioned dynamically balanced relative to the central axis M of the X-ray tube 100 and are rotatably seated in the vacuum housing in a way yet to be set forth in greater detail. A stator 31 is schematically illustrated in FIG. 1 and is placed on the outside of the housing part 2 in the region of the small diameter thereof for the purpose of driving the rotor 12 and the anode dish 4. This stator 31, together with the rotor 12, forms an electrical squirrel-cage motor in a known way for driving the anode dish 4.

The rotor 12 and the anode dish 4 are supported by two roller bearings 13 and 14 on a stationary axle 15, whose center axis coincides with the center axis M of the X-ray tube 100. A bearing sleeve 16 is arranged between the rotor 12 and the outer rings of the roller bearings 13 and 14 and this sleeve 16 comprises a radially outwardly-directed flange that presses against a corresponding radially inwardly-directed flange of the rotor 12. The bearing sleeve 16 and rotor 12 are connected to one another in the region of their flanges with the assistance of threaded fasteners, such as screws, and the center lines 101 of two such screws are indicated in broken lines in FIG. 1.

The end of the axle 15 remote from the anode dish 4 is accepted in a sheet metal sleeve 17 that is supported via an insulator 18 in the bore of the section of the housing part 2 having the smallest diameter. It is self-understood that the connection between the axle 15 and sheet metal sleeve 17, the connection between the sheet metal sleeve 17 and the insulator 18, and the connection between the insulator 18 and the housing part 2 are all vacuum-tight connections formed, for example, by soldering. It should be noted that each of the examples of Joints formed by soldering could also be formed by brazing, if desired.

The cylindrical, other end 27 of the axle 15 is supported by a mounting part 19 at an insulator 20 that is, in turn, supported in the bore of a bowl-shaped housing part 22 via a metallic intermediate ring 21. The insulator 20 is joined in an axially non-dislocatable fashion to the intermediate ring 21 and the intermediate ring 21, in turn, is connected in an axially non-dislocatable fashion to the housing part 22. The connection of the insulator 20 to the intermediate ring 21 and the connection of the intermediate ring 21 to the housing part 22 can be made by soldering. The housing part 22 is introduced into a corresponding central bore of the housing part 3 and is joined thereto in a vacuum-tight manner, for example by soldering or brazing.

Figure 2:
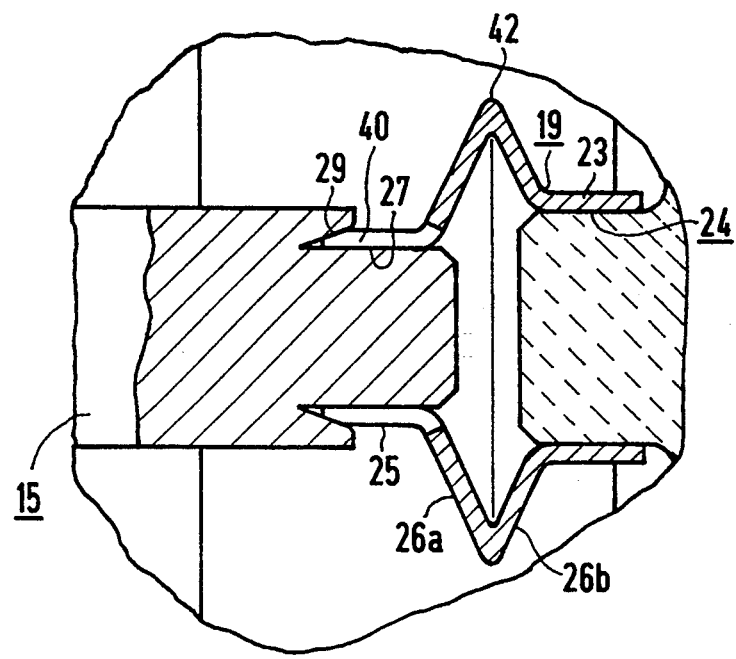
FIG. 2 is an enlarged cross sectional view with portions in elevation for purposes of illustration of the mounting assembly illustrated in FIG. 1.
Figure 3:
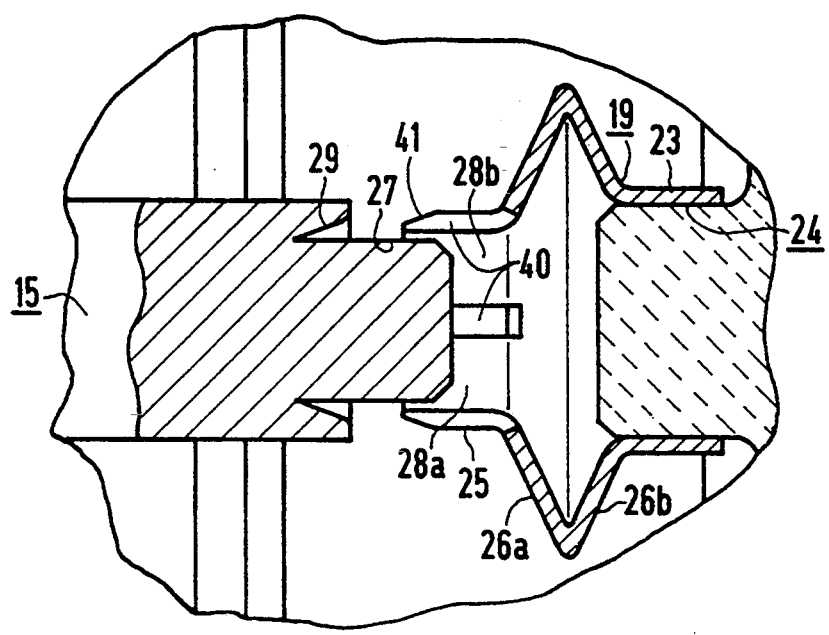
FIG. 3 is an enlarged cross sectional view similar to FIG. 2 illustrating the mounting assembly prior to completing the assembly.

The mounting part or sleeve 19 is executed as an essentially dynamically balanced sheet metal structural part. As best illustrated in FIGS. 2 and 3, it comprises a first sleeve section 23 with which it is placed on a part of a cylindrical housing projection 24, namely a projection or shoulder of the insulator 20 free of radial play. The mounting part 19 has a first sleeve section 23 fixed on the housing part 24 in an axially non-dislocatable fashion, for example by soldering.

The mounting part 19 also comprises a second sleeve section 25 into which the cylindrical end 27 of the axle 15 is introduced when the X-ray tube is assembled. In order to be able to compensate for manufacturing tolerances in an axial direction, the first and second sleeve sections 23 and 25 of the mounting part 19 are joined to one another by two sections 26a and 26b, which are outwardly-extending flange-like portions interconnected by an annular ridge 42 (FIG. 2) to have a shape like two Belleville spring washers.

In the fabrication of the described X-ray tube, one proceeds so that the housing part 3 is put in place on the housing part 2 and is soldered thereto vacuum-tight as the last work step before the evacuation of the vacuum housing 1. When putting the housing part 3 into place, the end 27 of the axle 15 must be introduced into the second sleeve section 25 of the mounting part 19, which is mounted on the housing part 24. Since this assembly must occur without adequate visual control, it is obviously difficult. In order to be able to avoid the problems connected therewith, the second sleeve section 25 of the mounting part 19 is fashioned so that the end 27 of the axle 15 can be initially introduced into the second sleeve section 25 with radial play. To this end, the second sleeve section 25 has a shape expanding slightly conically in the direction toward the anode dish 4 shown in FIG. 3 before the complete introduction of the axle 15.

In order to be able to place the sleeve section 25 against the end 27 of the axle 15 play-free in the required way at the end of the assembly process, the second sleeve section 25 is fashioned radially resilient, namely in that it is provided with a plurality of axially-extending or proceeding slots or incisions 40, which are uniformly distributed over its circumference. A total of four slots 40 are illustrated in the exemplary embodiments, and these slots 40 subdivide the sleeve section 25 into a plurality of fingers corresponding in number to the number of slots. In FIG. 3, fingers 28a and 28b are visible.

In order to be able to place the second sleeve section 25 or, respectively, the fingers thereof seated at the end 27 of the axle 15 without radial play, clamp means are formed by an annular bevel 29, which is provided at the end of the axle 15. The bevel 29 expands in a direction toward the second sleeve section 25 and is placed so that it comes into engagement with the free ends 41 of the second sleeve section 25 or, respectively, the fingers thereof shortly before the housing part 3 is completely seated on the housing part 2 and the bevel 29 radially inwardly deforms these fingers or ends and, thus, places them seated at the end of the axle 15.

In order to guarantee a play-free seating of the sleeve section 25 at the end 27 of the axle 15, the bevel 29, to be more precise, is placed so that, even taking the least beneficial manufacturing tolerances into consideration, it assures that the play-free seating of the second sleeve section 25 at the end of the axle 15 is established before the housing part 3 presses against the housing part 2. The complete seating of the housing part 3 on the housing part 2 is then produced by deformation of the sections 26a and 26b of the mounting part or sleeve 19, which sections 26a and 26b are shaped like Belleville spring washers. It, thus, becomes clear that a play-free seating of the second sleeve section 25 at the end 27 of the axle 15 is assured, even given an unfavorable situation of the manufacturing tolerances of the particular component parts.

In order to reduce these forces that are required during assembly in order to place the second sleeve section 25 seated at the end 27 of the axle 15 free of radial play, the second sleeve section 15 is correspondingly beveled at its end 41 or, respectively, the fingers of the second sleeve section 25 are beveled at their ends 41 with a bevel which corresponds to the bevel 29. However, there is also the possibility of providing a rounded portion instead of beveling at these ends 41.

Figure 4:
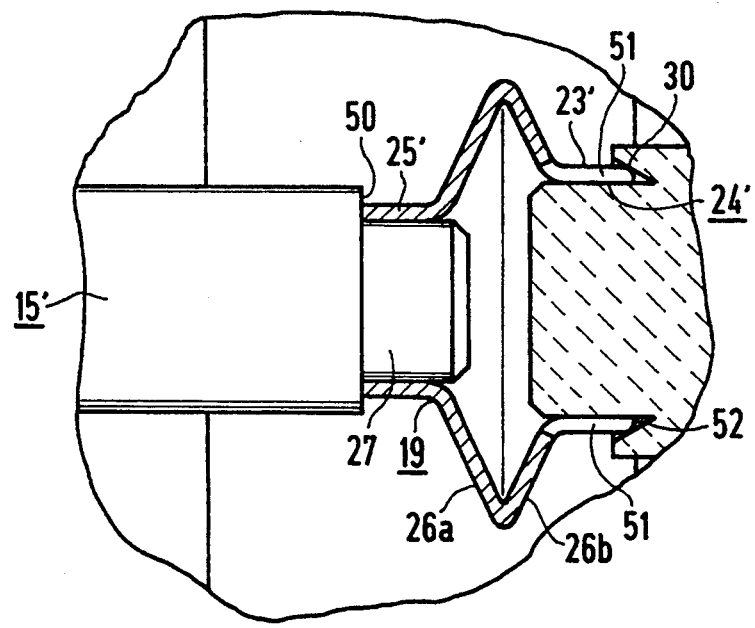
FIG. 4 is an enlarged cross sectional view similar to FIG. 2 of an embodiment of the mounting assembly in accordance with the present invention.

An embodiment of a mounting part 19' is shown in FIG. 4 and coincides with the mounting part set forth in a number of points. For this reason, identical or similar element numbers are used.

By contrast to the above-described embodiment of FIGS. 2 and 3, the mounting part 19' in the embodiment of FIG. 4 has its second sleeve section 25' joined in an axially non-dislocatable fashion to the end 27' of the axle 15, which end 27' has a shoulder 50. The first sleeve section 23', instead of the second sleeve section 25', is subdivided into fingers by incisions or slots 51 and is fashioned analogously to the sleeve section 25 in the case of the above-described embodiment of FIGS. 2 and 3. A housing projection 24' is initially telescopically introduced play-free into this first sleeve section 23'. Only at the end of the assembly process is the first sleeve section 23' placed seated at a housing projection 24' free of radial play, namely on the basis of a bevel 30 which is provided on the housing projection 24'. The bevel 30 and the first sleeve section 23' thereby interact in such a way as was set forth above for the bevel 29 and the second sleeve section 25. Differing from the above-described embodiment, the first sleeve section 23' is not beveled at its free end 52, but is provided with a rounded-off end.

Figure 5:
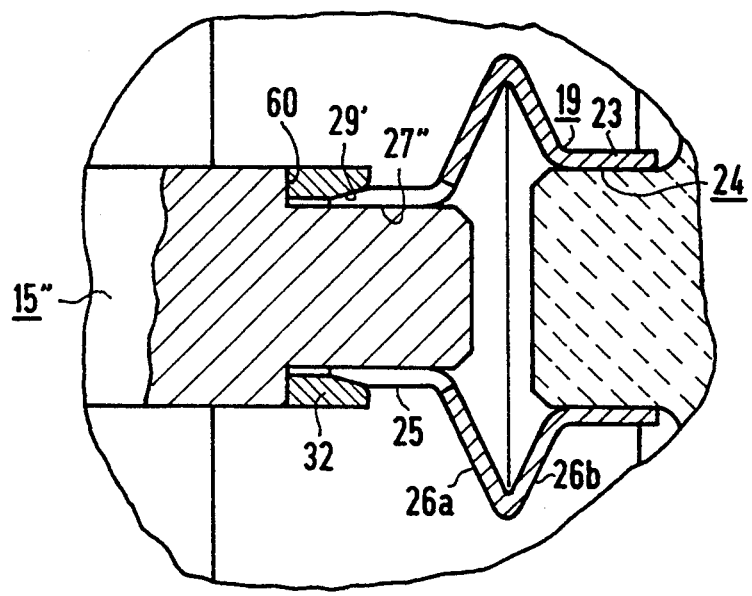
FIG. 5 is an enlarged cross sectional view similar to FIG. 2 of a second embodiment of the mounting assembly in accordance with the present invention.
Figure 6:
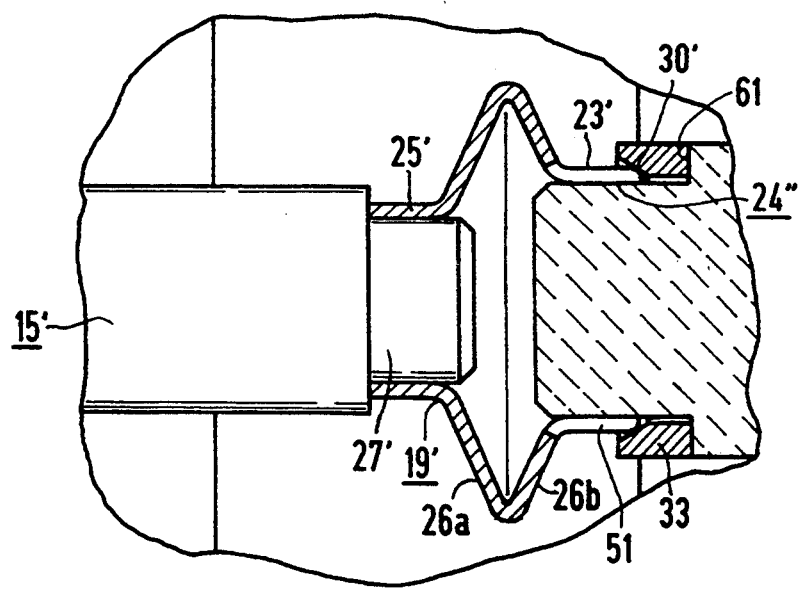
FIG. 6 is an enlarged cross sectional view similar to FIG. 2 of a third embodiment of the mounting assembly in accordance with the present invention.

The exemplary embodiments illustrated in FIGS. 5 and 6 differ from the exemplary embodiments of FIGS. 1–3 or, respectively, the exemplary embodiment of FIG. 4, in that a bevel 29' or, respectively, 30' is not fashioned on the end 27 of the axle 15 or, respectively, the housing projection 24' itself. A ring 32 has the bevel 29', while a ring 33 has the bevel 30', and each of the rings are placed onto either the axle 15" or, respectively, the housing projection 24". As shown in FIGS. 5 and 6, the ring 32 or, respectively, 33 can be placed onto the axle 15" or, respectively, on the housing projection 24" with radial play in a way that is beneficial in production-oriented terms. The radially play-free seating of the sleeve section 25 or, respectively, 23' on the axle 15" or, respectively, on the housing projection 24' is nevertheless assured. Moreover, the ring 32 or, respectively, 33 automatically centers itself at the end of the assembly process relative to the axle 15" or, respectively, the housing projection 24', wherein the ring 32 is engaged on a shoulder 60 of the axle 15", and the ring 33 is engaged on a shoulder 61 on the housing projection 24".

However, it is provided in the exemplary embodiments that the sleeve section 25' is seated without radial play at the end 27' of the axle 15' or, respectively, the sleeve section 23 is seated without radial play at the housing projection 24, there is also the possibility of providing slight play here. In the exemplary embodiments that have been set forth, the mounting assembly of the invention is employed in an X-ray tube. This is thereby a preferred utilization of the device. Other employments of the mounting assembly of the invention are possible whenever a similar, problematic situation is present.

Although various minor modifications may be suggested by those versed in the art, it should be understood that we wish to embody within the scope of the patent granted hereon all such modifications as reasonably and properly come within the scope of our contribution to the art.

We claim:

1. A mounting assembly for an axle of a rotating anode in a vacuum housing of an X-ray tube wherein at least one end of the axle is connected to the housing, said assembly comprising a mounting part connecting the axle to the housing and having at least one sleeve section for telescopically receiving an end of the axle or a housing projection with radial play during an assembly process, and said assembly having clamp means provided for acting, at the end of the assembly process, on said at least one sleeve section to cause a substantially play-free engagement between said at least one sleeve section and the end of the axle or the housing projection respectively.

2. A mounting assembly according to claim 1, wherein said mounting part has a further sleeve section for receiving the housing projection or the end of the axle respectively, whichever is not received in said at least one sleeve section.

* * * * *